US005750241A

United States Patent [19]

Kobayashi et al.

[11] Patent Number: 5,750,241

[45] Date of Patent: May 12, 1998

[54] METHOD OF FORMING COLORED RELIEF-AND-INDENTATION PATTERNS AND A THERMAL TRANSFER FOIL

[75] Inventors: Koichi Kobayashi; Wataru Iwanami; Taiyo Kanai, all of Suwa, Japan

[73] Assignee: Seiko Epson Corporation, Tokyo, Japan

[21] Appl. No.: 325,468

[22] PCT Filed: Feb. 25, 1994

[86] PCT No.: PCT/JP94/00306

§ 371 Date: Dec. 21, 1994

§ 102(e) Date: Dec. 21, 1994

[87] PCT Pub. No.: WO94/20312

PCT Pub. Date: Sep. 15, 1994

[30] Foreign Application Priority Data

Mar. 8, 1993 [JP] Japan .................................... 5-009499
Mar. 8, 1993 [JP] Japan .................................... 5-046908

[51] Int. Cl.$^{6}$ ........................................................ B32B 3/00

[52] U.S. Cl. .......................... 428/199; 428/200; 428/202; 428/204; 428/207; 428/208; 428/209; 428/210; 428/220; 428/325; 428/344; 428/347; 428/354; 428/425.9; 428/913; 428/914; 156/233; 156/235; 156/239; 156/240

[58] Field of Search .................................... 428/199, 200, 428/202, 204, 207, 209, 210, 344, 347, 354, 195, 208, 220, 323, 325, 425.9, 913, 914; 156/233, 235, 239, 240

[56] References Cited

U.S. PATENT DOCUMENTS

| | | | |
|---|---|---|---|
| 4,629,647 | 12/1986 | Sander | 428/914 |
| 4,631,222 | 12/1986 | Sander | 428/914 |
| 4,837,072 | 6/1989 | Kraetschmer | 428/202 |
| 5,053,260 | 10/1991 | Brehm | 428/914 |
| 5,063,658 | 11/1991 | Wild | 428/901 |
| 5,250,346 | 10/1993 | Nagai | 428/914 |
| 5,296,299 | 3/1994 | Makashima | 428/914 |
| 5,344,705 | 9/1994 | Olsen | 428/323 |
| 5,393,590 | 2/1995 | Caspari | 428/914 |

FOREIGN PATENT DOCUMENTS

| | | |
|---|---|---|
| 0 487 724 A1 | 6/1990 | European Pat. Off. . |
| 487724 | 6/1992 | European Pat. Off. . |
| 54-43263 | 9/1977 | Japan . |
| 53-24322 | 6/1978 | Japan . |
| 60-55303 | 12/1985 | Japan . |
| 63-85784 | 9/1986 | Japan . |
| 61-235787 | 10/1986 | Japan . |
| 2 220 386 | 1/1990 | United Kingdom . |

*Primary Examiner*—Timothy Speer

[57] ABSTRACT

A thermal transfer foil (4) on which the following layer are stacked is superimposed on one side of a base film (**4*a*), approximately 12 μm to 25 μm thick, relative to a substrate (11), such as a metal plate, comprising a timepiece face plate: a separable processing layer (4*b*), approximately 0.02 μm thick; a transparent protective coloring layer (4*c*), approximately 2 μm thick; and a reflection layer (4*d*), approximately 0.03 μm to 0.05 μm thick; as well as a thermoplastic resin layer (4*e*). Then, the base film (4*a*) is peeled off the thermal transfer foil (4), and then heat-pressed using a mold (21). Fine relief-and-indentation patterns are provided on the pressing surface (22) of the mold (21), which are transferred to the protective coloring layer (4*c*), the reflection layer (4*d*), and the thermoplastic resin layer (4*e***).

37 Claims, 8 Drawing Sheets

METHOD OF FORMING COLORED RELIEF-AND-INDENTATION PATTERNS AND A THERMAL TRANSFER FOIL

BACKGROUND OF THE INVENTION

1. Field of the Invention

This invention concerns a method of forming colored relief-and-indentation patterns that provide colored relief-and-indentation patterns on timepiece face plates and other components, and a thermal transfer foil used in those patterns; in particular, it concerns a technique of producing extremely small relief-and-indentation patterns.

2. Related Background Art

As shown in FIG. 6A, in the field of thermal transfer printing a thermal transfer foil (50), made by stacking the following layers on a base film (53) 12 μm to 25 μm thick, is used: a protective coloring layer (52) consisting of a colorless transparent, colored transparent, or colored semi-transparent resin layer approximately 2 μm thick or greater; and a reflection layer (51) consisting of a vapor-deposited aluminum thin-film layer 0.03 μm to 0.05 μm thick. On this thermal transfer foil (50), a thin, separable processing layer (54) is formed between the protective colored layer (52) and the base film (53). A bonding layer (55) is formed underneath the reflection layer (51). Also, as shown in FIG. 6B, in some cases a thermal transfer foil (50*a*) is used, which is called a pigment foil, made with a pigment (56), which is a combination of the protective colored layer and the reflection layer.

Of these thermal transfer foils, if a colored relief-and-indentation pattern is printed using the thermal transfer foil (50), first, a thermoplastic resin layer (61) is formed on the surface to be decorated on the substrate (60), as shown in FIG. 7A If the surface to be decorated of the substrate (60) itself consists of a thermoplastic resin, the provision of the thermoplastic resin layer (61) is not necessary. Next, as shown in FIG. 7B, the thermal transfer foil (50) is superimposed on the thermoplastic resin layer (61) of the substrate (60). Under these conditions the thermal transfer foil (50) is heat-pressed using the mold (62). This results in the transfer of the relief-and-indentation patterns (3D patterns) on the pressing surface of the mold (62) from the protective colored layer (52) to the thermoplastic resin layer (61). When the base film (53) is peeled off, the colored relief-and-indentation pattern is copied onto the surface of the substrate (60) as shown in FIG. 7C Because the method of forming colored relief-and-indentation patterns using the thermal transfer foil (50) can thus easily form colored relief-and-indentation patterns, if fine relief-and-indentation patterns (3D patterns), especially striped patterns at approximately 1 μm to 2 μm in size can be copied, the technique could be applied to the fabrication of components and products in a variety of fields, such as decorative components, nameplates, and timepiece parts.

However, if fine colored relief-and-indentation patterns must be formed, such as for the fabrication of timepiece face plates, as shown in FIG. 8A, a thermoplastic resin layer (61) could be formed on the surface of the face plate, and then, as shown in FIG. 8B, the thermal transfer foil (50) is superimposed. If heat-pressing is performed using a mold (72) having the pressing surface (73) on which fine relief-and-indentation patterns are formed, the fine relief-and-indentation patterns on the pressing surface (73) will be copied onto the surface of the base film (53). However, when the base film (53) is removed, the patterns are not copied to the reflection layer (51), the bonding layer (55), or the thermoplastic resin layer (61). Thus, a problem exists in that the minimum size of a transferable relief-and-indentation pattern is limited to a coarse 12 μm that is the thickness of the base film (53).

The following is an explanation of the limits on the relief-and-indentation patterns that can be transferred using prior art by reference to FIGS. 9A and 9B. These figures show the condition in which relief-and-indentation patterns are transferred to the surface of the substrate (60) on the premise that, although the material composing the stacked layers expands and shrinks, the thickness H of any deformed components remains constant, and that because of its thermoplasticity, the thermoplastic resin layer (61) on the top surface of the substrate (60) leaves no gap between itself and the bonding layer (55) of the thermal transfer foil (50). The figures also show a condition in which the smallest possible relief-and-indentation patterns are applied repeatedly in a specified direction through the use of the thermal transfer foil (50).

As indicated in these figures, if the smallest possible relief-and-indentation patterns are formed in the smallest pitch using a thermal transfer foil of thickness H, the result is a see-through layer because the protective coloring layer (52) is either colorless and transparent or colored and semi-transparent. Therefore, the patterns that are actually visible are the relief-and-indentation patterns that occur on the reflection layer below. If R denotes the minimum size of the indentation patterns, in specific numerical values, size R is the sum of the thickness of the base film (53), 12 μm, and the thickness of the protective coloring layer (52), 2 μm, which is equal to approximately 14 μm, which is a large value.

By contrast, the minimum size, in the case of a relief pattern, is r, which is defined by the shape of the reflection layer (51). In specific numerical values, r size is 2 μm, equivalent to the thickness of the bonding layer (55), even when the thickness of the reflection layer (51), 0.03 μm to 0.05 μm, is ignored.

The minimum size h of the relief-and-indentation pattern on the transferred patterns is approximately equal to the thickness of the thermal transfer foil (50). Even when the thicknesses of the reflection layer (51) and the separable processing layer (54) are ignored, this is equal to the sum of the thicknesses of the base film (53) (12 μm), the protective coloring layer (52) (2 μm), and the bonding layer (55) (2 μm), for a total of 16 μm, which is a large value. The minimum repetition pitch P of relief-and-indentation patterns is two times the thickness of the thermal transfer foil (50), 16 μm, for a total of 32 μm, which is also a large value.

The aforementioned values are theoretically minimum sizes. In actuality, the sizes are larger. Thus, a conventional printing method is incapable of transferring fine stripes and 3D relief-and-indentation patterns measuring 1 μm to 2 μm. Further, in actuality no thermal transfer foils suitable for the transfer of fine relief-and-indentation patterns have yet been implemented.

These limitations on microfabrication are also applicable when fine relief-and-indentation patterns are pre-formed on the substrate side and a thermal transfer foil is transferred to the patterns through the use of silicone rubber.

Therefore, when forming fine, colored relief-and-indentation patterns, the fine patterns are applied to the metal or resin that makes up the substrate by means of grinding, pressing, plating, laser processing, or injection molding in order to form relief-and-indentation patterns to which plating, vapor deposition, ion-plating, printing, or coating is applied in order to protect and color the surface. However, each of these processing methods requires expensive, large-scale equipment. Moreover, high-load operations involving the use of press equipment or plating operations in the order of 100 to 200 tons are both dangerous and harmful and require complex machining operations. Therefore, another problem with prior art is that it is incapable of reducing machining costs for the formation of fine relief-and-indentation patterns.

In view of the above problems, this invention seeks to implement a method of forming colored relief-and-indentation patterns capable of easily transferring fine relief-and-indentation patterns and a thermal transfer foil that can be used therein, even for thermal transfer printing that requires the use of a thermal transfer foil.

SUMMARY OF THE INVENTION

To solve the above problems, the method of formation of colored relief-and-indentation patterns of this invention superimposes, through the use of heat pressing and other means, a thermal transfer foil on which a base film, a separable processing layer, a protective coloring layer, a reflection layer, and a bonding layer are stacked, on the surface to be decorated, that has thermoplasticity, of the target material, through the bonding layer, in a bonded manner. After the base film is removed under these conditions, a mold containing relief-and-indentation patterns is heat-pressed onto the thermal transfer foil, thus transferring the relief-and-indentation patterns to the target surface. Thus, in the method of formation of relief-and-indentation patterns of this invention, relief-and-indentation patterns are transferred in such a way that no base film is used. Thus, this method is capable of faithfully transferring relief-and-indentation patterns to the reflection layer on which the patterns are to be reflected.

Another method of the formation of the colored relief-and-indentation patterns of this invention superimposes a thermal transfer foil on which a base film, a separable processing layer, a protective coloring layer, a reflection layer, and a bonding layer are stacked to the surface to be decorated, that has thermoplasticity, of the target material, through the bonding layer. After the base film is removed under these conditions, the mold containing relief-and-indentation patterns is heat-pressed onto the thermal transfer foil, thus transferring the relief-and-indentation patterns to the surface to be decorated. Thus, the relief-and-indentation patterns are immediately transferred to the reflection layer on which the patterns are reflected. This permits a faithful transfer of patterns, even when they contain minute relief-and-indentation patterns. Here, the coloring reflection layer can be composed of, for example, a pigment layer containing pigments. The coloring reflection layer can also be made with a metallic layer or a metal-compound layer. In this case, the protective layer can be omitted because the coloring reflection layer itself serves as a surface protection layer. In particular, if a coloring reflection layer is made by stacking several metallic or metal-compound layers of different metals, the strength of the coloring reflection layer can be enhanced by placing a weather-resistant layer on the surface side. In addition, a colored reflection layer of colors that cannot be produced with a single material can also be obtained.

If a protective layer is provided between the separable processing layer and the colored reflection layer, the thickness of the protective layer should be limited to 0.2 μm or less in order to ensure the transfer of fine relief-and-indentation patterns.

In this invention, the target material to be decorated can be either a thermoplastic resin layer or a non-thermoplastic material, such as a metallic plate or a glass bottle composing a timepiece face plate. In the latter case, a thermoplastic resin layer is formed on the surface side and the resulting surface is used as the thermoplastic surface to be decorated.

For the aforementioned target materials, if relief-and-indentation patterns are formed on the non-thermoplastic surface of a target material, either a thermal transfer foil made by stacking a separable processing layer, a protective coloring layer, a reflection layer, and a thermoplastic resin layer or a thermal transfer foil made by stacking a separable processing layer, a coloring reflection layer, and a thermoplastic resin layer should be used on one side of the base film. That is, it is desirable to use a material made by stacking a thermoplastic resin layer on the thermal transfer foil itself. When a thermal transfer foil of this composition is used, by pasting the thermal transfer foil on the surface of the target material to be decorated, the same condition is produced thereby forming a thermoplastic resin layer on the surface to be decorated, and thus eliminating the process of forming a thermoplastic resin layer on the surface to be decorated.

In this case the thermoplastic resin layer itself can be used as a bonding layer in order to superimpose a thermal transfer foil onto the surface of the target material to be decorated. Alternatively, a bonding layer can be formed on the underlayer, i.e., the side that comes into contact with the surface of the target material to be decorated.

In this invention, the surface to be decorated, having thermoplasticity, refers to the surface to be decorated, consisting of a thermoplastic resin layer, as well as the surface to be decorated, consisting of a heat-hardening resin layer in a semi-hardened state.

Other objects and attainments together with a fuller understanding of the invention will become apparent and appreciated by referring to the following description and claims taken in conjunction with the accompanying drawings.

DESCRIPTION OF THE PREFERRED EMBODIMENTS

The following is an explanation, with reference to drawings, of the method of forming colored relief-and-indentation patterns as it relates to the embodiments of the present invention.

Embodiment 1

FIGS. 1A–1D are process cross-sectional diagrams that show the method for the formation of the colored relief-and-indentation patterns of this embodiment.

Figure 1A:
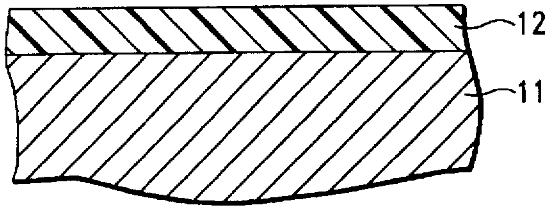
FIGS. 1A–1D are process cross-sectional diagrams that show the method of formation of the colored relief-and-indentation patterns of Embodiment 1 of the present invention.

In FIG. 1A, a substrate (11) (the target material) to which the method of formation of relief-and-indentation patterns of this embodiment is applied is a metal plate, among other things, that comprises the face plate (decorative material) of a timepiece. To form colored relief-and-indentation patterns on this substrate (11), first, a thermoplastic resin layer (12) (the surface to be decorated) is formed on the surface of substrate (11). For thermoplastic resin layer (12), a resin whose deformation temperature ranges is from approximately 60° C. to approximately 200° C. is selected. This resin can be a paint such as epoxy, acryl, polyurethane, alkyd, vinyl, or olefin resin; or an ink. The thickness of the thermoplastic resin layer (12) is set according to the roughness of the relief-and-indentation patterns. In the case of fine patterns, the thickness is set at approximately 5 μm. For rough patterns it is set at approximately 100 μm.

Figure 1B:
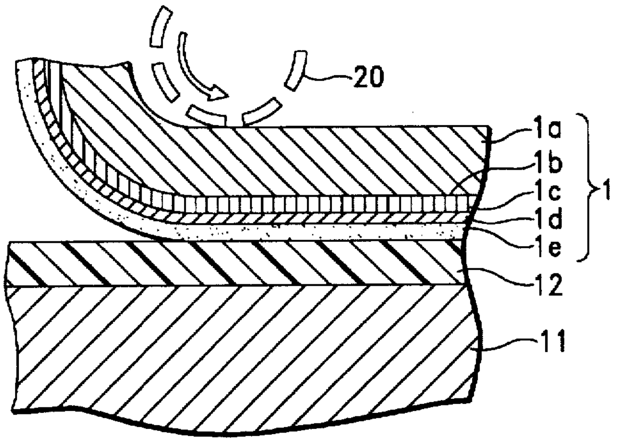

Next, as shown in FIG. 1B, thermal transfer foil (1) is superimposed on the surface of thermoplastic resin layer (12) of substrate (11). The surface of this stacked material is pressed using a heated roller (20) or some other device. The thermal transfer foil (1) is made by stacking a separable processing layer (1*b*), approximately 0.02 μm thick; a transparent protective coloring layer (1*c*), approximately 2 μm thick; a reflection layer (1*d*), approximately 0.03 μm–0.05 μm thick; and a bonding layer (1*e*), approximately 2 μm thick, on one side of base film (1*a*), approximately 12 μm–25 μm thick. These laminated materials are manufactured in an elongated shape and supplied in rolls, for example. The reflection layer (1*d*) is a thin-film layer of aluminum which is vapor-deposited on base film (1*a*) on which protective coloring layer (1*c*) is formed. The separable processing layer (1*b*) is a processing layer applied to base film (1*a*); it is formed in order to enhance the ease with which base film (1*a*) can be peeled off. Bonding layer (1*e*) is of a type that has a temperature characteristic that is compatible with the deformation temperature of the thermoplastic resin layer (12).

Figure 1C:
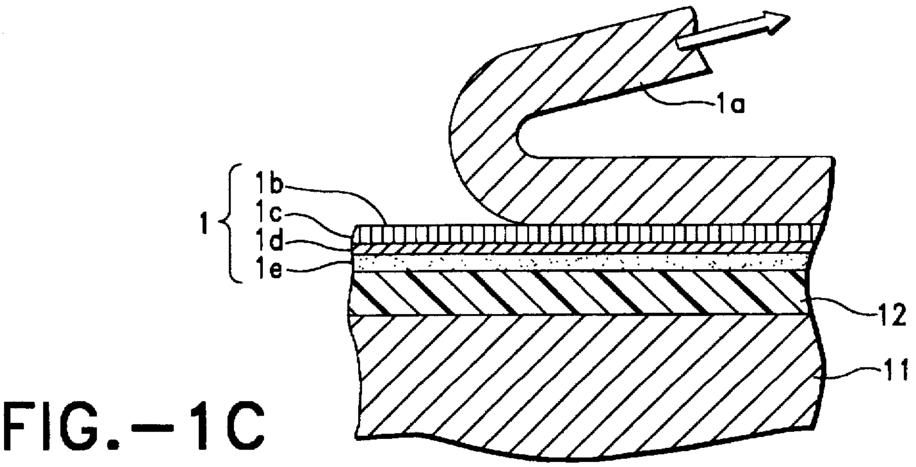

Next, base film (1*a*) of the thermal transfer foil is removed by peeling, as shown in FIG. 1C. The resulting condition of substrate (11) side is that in which the bonding layer (1*e*), the reflection layer (1*d*), the protective coloring layer (1*c*), and the separable processing layer (1*b*) have been copied.

Figure 1D:
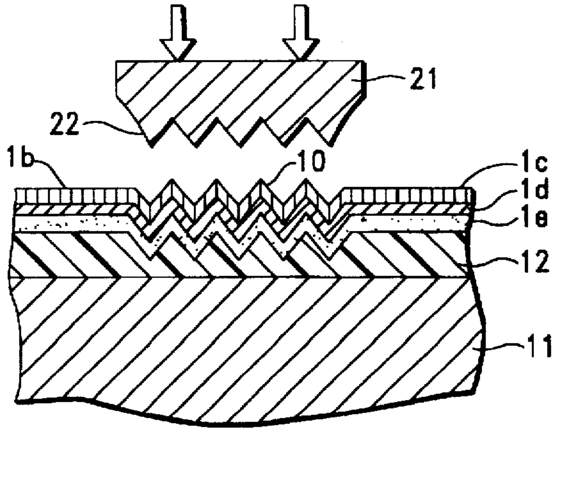

After that, the thermal transfer foil (1), from which the base film (1*a*) has been peeled off, is heat-pressed using the mold (21) as shown in FIG. 1D. Because pressing surface (22) of molding material (21) contains minute relief-and-indentation patterns a few microns in size, after mold (21) is pressed, minute relief-and-indentation patterns are transferred as minute, copied relief-and-indentation patterns to protective coloring layer (1*c*), reflection layer (1*d*), bonding layer (1*e*), and thermoplastic resin layer (12). During this operation, because the surface of protective coloring layer (1*c*) is provided with separable processing layer (1*b*), mold (21) separates easily. However, if mold (21) is too hot during the heat-pressing, the separable processing layer (1*b*) sticks to pressing surface (22) of mold (21). Therefore, the temperature of the heat-pressing operation should be set appropriately according to the properties of separable processing layer (1*b*).

After this operation, final printing, such as the printing of timepiece lettering, is performed on the surface on which the fine patterns from substrate (11) are imprinted.

As described above, in the method of formation of colored relief-and-indentation patterns, thick base film (1*a*) is peeled off before thermal transfer foil (1) is heat-pressed using mold (21). Therefore, the heat-pressing operation is performed on thermal transfer foil (1) that has become thin. Consequently, the fine relief-and-indentation patterns from mold (21) are faithfully transferred to reflection layer (1*d*) on which patterns are reflected.

Figure 9A:
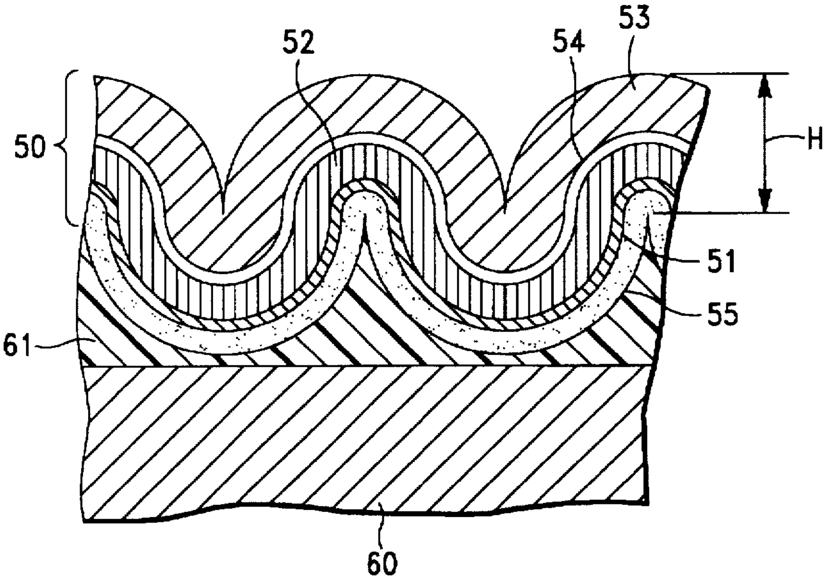
FIG.–9A (PRIOR ART)
FIGS. 9A and 9B are cross-sectional diagrams that illustrate the relationship between the thermal transfer foil, the thicknesses of the layer comprising the thermal transfer foil, and the roughness of the relief-and-indentation patterns made by the conventional method for the formation of colored relief-and-indentation patterns.
Figure 9B:
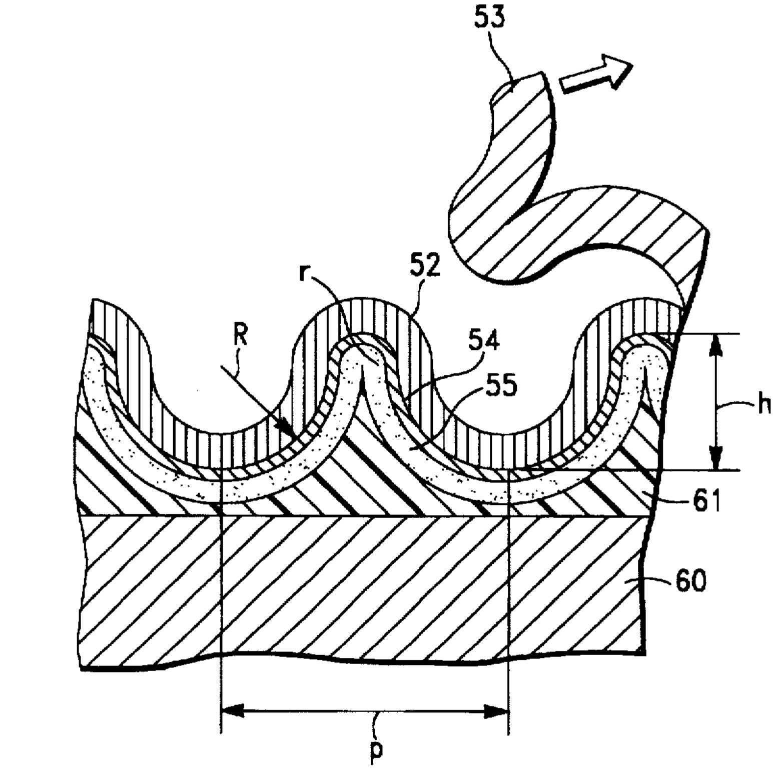
FIG.–9B (PRIOR ART)

As far as any limits on making the relief-and-indentation patterns finer are concerned, as explained above with reference to FIGS. 9A and 9B, if heat-pressing is conducted in the presence of base film (1*b*), the smallest size of the curvature of an indentation (the dimension R in FIG. 9B, must equal the sum of the thickness of base film (1*a*) and the thickness of protective coloring layer (1*c*). However, because in this embodiment a heat-pressing operation is conducted in the absence of base film (1*a*), the smallest size of the curvature of an indentation in a relief-and-indentation pattern can be reduced to 2 μm, the thickness of the protective coloring layer (1*c*). When a heat-pressing operation is conducted in the presence of base film (1*a*), the smallest relief-and-indentation pattern in the transferred patterns (the h size in FIG. 9B is approximately equal to the overall thickness of thermal transfer foil (1), including the thickness of base film (1*a*). However, because in this embodiment the heat-pressing is performed in the absence of base film (1*a*), the h size can be reduced to approximately 4 μm, the sum of the thickness of protective coloring layer (1*c*) (approximately 2 μm) and the thickness of bonding layer (1*e*) (approximately 2 μm), if the thickness of reflection layer (1*d*) and separable processing layer (1*b*) is ignored. Further, the minimum repeating pitch (the P size in FIG. 9B of the relief-and-indentation patterns, when the heat-pressing is performed in the presence of base film (1*a*), is approximately double the overall thickness of thermal transfer foil (1), including the thickness of base film (1*a*). However, because in this embodiment the heat-pressing is performed in the absence of base film (1*a*), the P size can be reduced to approximately 8 μm if the thickness of reflection layer (1*d*) and separable processing layer (1*b*) is ignored. Consequently, according to the method for the formation of the colored relief-and-indentation patterns of this example, because thick base film (1*a*) is removed, the result is the same as would be achieved using an extremely thin thermal transfer foil. Therefore, even very fine relief-and-indentation patterns can be copied faithfully.

Embodiment 2

FIGS. 2A–2D are process cross-sectional diagrams that show the method for the formation of the colored relief-and-indentation patterns of the present embodiment. The method for the formation of the colored relief-and-indentation patterns of the present embodiment is the same as the method for the formation of the colored relief-and-indentation patterns of Embodiment 1 in basic components; only the organization of the thermal transfer foil which is used is different. Therefore, the same codes are assigned to the corresponding components, and their detailed explanation is omitted.

Figure 2A:
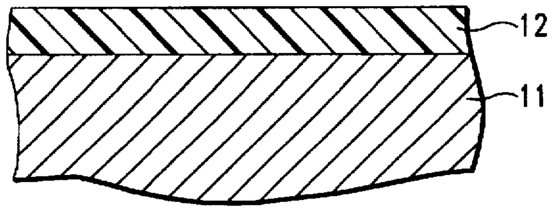
FIGS. 2A–2D are process cross-sectional diagrams that show the method of formation of the colored relief-and-indentation patterns of Embodiment 2 of the present invention.

As shown in FIG. 2A in this embodiment also, since substrate (11) (the target material) to which the method for the formation of the colored relief-and-indentation patterns of this embodiment is applied is a metal plate, among other things, that may comprise the face plate (decorative material) of a timepiece, a thermoplastic resin layer (12) (the surface to be decorated) is formed on the surface of substrate (11) before the colored relief-and-indentation patterns are transferred to substrate (11).

Figure 2B:
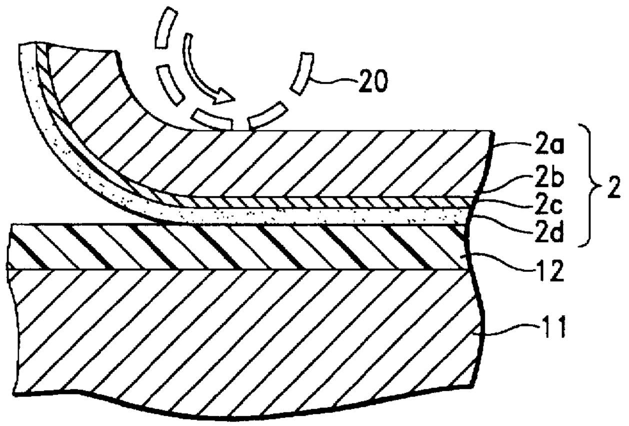

Next, as shown in FIG. 2B, thermal transfer foil (2) is superimposed on the surface of thermoplastic resin layer (12) of substrate (11). After that, thermal transfer foil (2) is pressed onto the surface using a heated roller (20) and other devices.

The thermal transfer foil (12) of this embodiment is a pigment foil on which the following layers are stacked: a base film (**2*a*), approximately 12 μm–25 μm thick; a separable processing layer (2*b*), approximately 0.02 μm thick; a pigment layer (2*c*) (a coloring reflection layer); and a bonding layer (2*d*),approximately 2 μm thick. Unlike the thermal transfer foil used in Embodiment 1, the surface of the pigment layer (2*c***) does not contain a protective coloring layer.

Figure 2C:
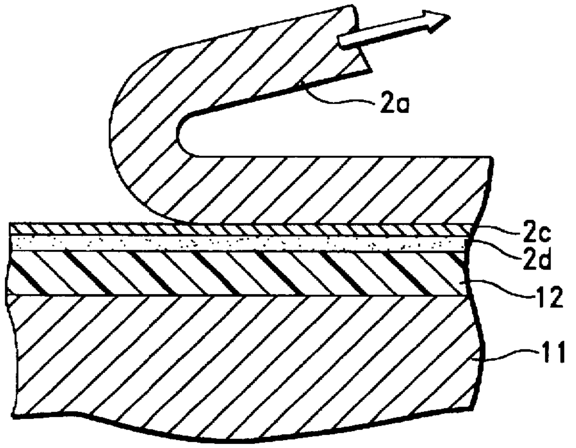

Next, as shown in FIG. 2C the base film (**2*a*) of the thermal transfer foil (2) is removed by peeling. The resulting condition is that in which bonding layer (2*d*), pigment layer (2*c*), and separable processing layer (2*b*) are transferred onto substrate side (11**).

Figure 2D:
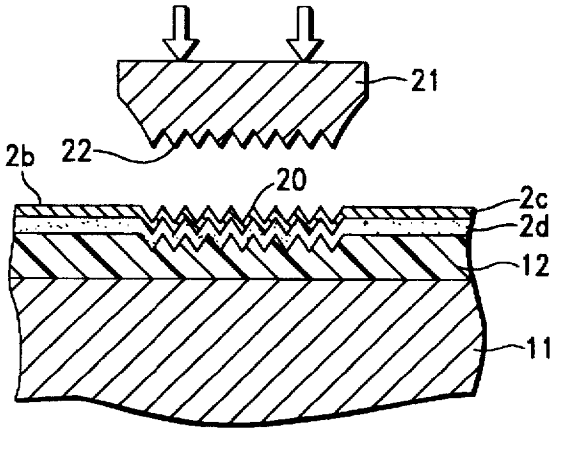

After that, as shown in FIG. 2D thermal transfer foil (2), from which base film (**2*a*) has been peeled off, is heat-pressed using mold (21). Because the pressing surface (22) of mold (21) is provided with minute relief-and-indentation patterns 1 μm to 2 μm in size, after the mold (21) is pressed, the minute relief-and-indentation patterns are transferred as minute, copied, relief-and-indentation patterns onto the pigment layer (2*a*), the bonding layer (2*d*), and the thermoplastic resin layer (12**).

As described above, in the method for the formation of the colored relief-and-indentation patterns of this embodiment also, before the thermal transfer foil (2) is heat-pressed using mold (21), thick base film (**2*a*) is peeled off. Therefore, the fine relief-and-indentation patterns from mold (21**) are faithfully transferred.

Further, in this embodiment the topmost surface during the formation of the relief-and-indentation patterns is pigment layer (**2*c*), so that mold (21) directly copies the relief-and-indentation patterns to pigment layer (2*c*). This makes it possible to copy exactly even finer relief-and-indentation patterns. On the other hand, because pigment layer (2*a*) itself is a reflecting surface, the greater the extent of luster in the pattern to be copied, the smaller the pattern appears. Also, the lower the brightness of pigment layer (2*c*), the greater is the visibility of the small, 3D effect of the relief-and-indentation patterns. Therefore, according to the colored relief-and-indentation pattern formation method of this embodiment, if a smoothly polished natural white-pearl oyster, for example, is formed, by plating as a mold, for making an ultra fine 3D pattern and a thermal transfer foil with a black pigment layer (2*c*) is used in order to form a colored relief-and-indentation pattern, a decorative surface similar to a natural black-pearl oyster, with rainbow-like coloration can be formed. In a similar manner, highly decorative timepiece face plates can be fabricated. If the surface roughness of the pressing surface (22) of mold (21**) and that of the decorative surface are measured using a surface roughness meter, the result, in both cases, should be an average roughness (Ra) of approximately 0.1 μm, equivalent to the average roughness (Ra) that would be found in a polished white-pearl oyster. Further, the curved pattern of the surface roughness of the decorative surface is equivalent to the curved pattern of the surface roughness of a polished white-pearl oyster. Therefore, this makes it possible to copy faithfully various ultra-fine relief-and-indentation patterns such as stripes measuring only approximately 0.1 μm.

Embodiment 3

Figure 3:
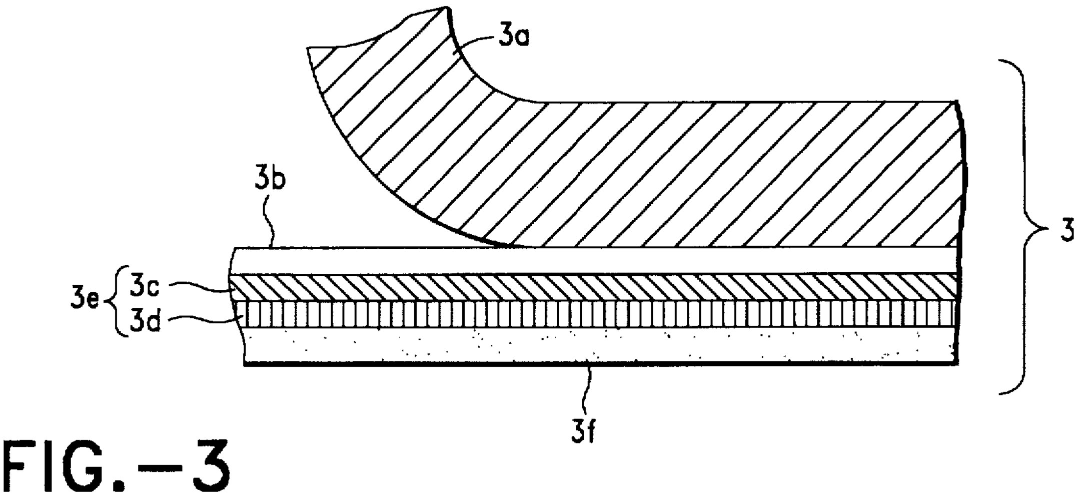
FIG. 3 is a cross-sectional diagram that illustrates the composition of the colored relief-and-indentation patterns of Embodiment 3 of the present invention.
Figure 6A:
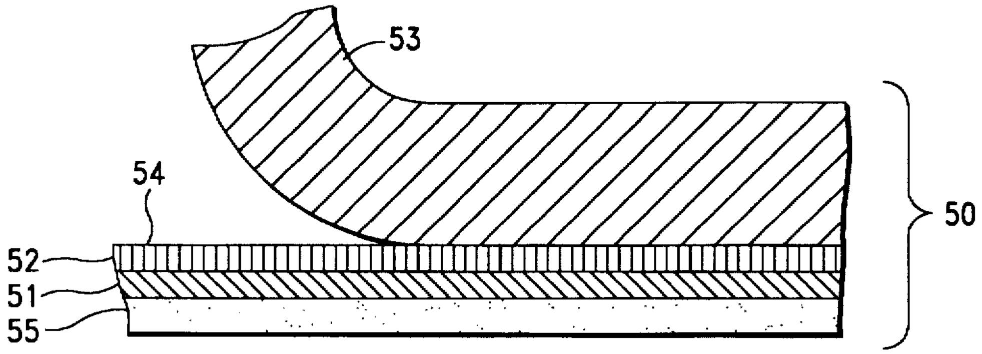
FIG.-6A (PRIOR ART)
FIGS. 6A and B are cross-sectional diagrams that show the organization of a conventional thermal transfer foil.
Figure 6B:
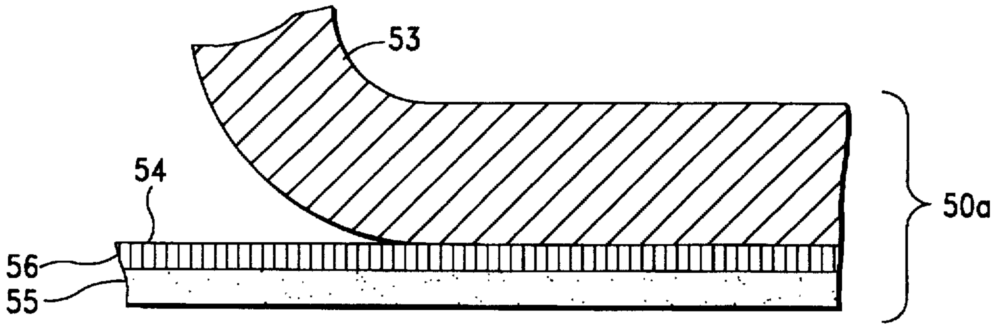
FIG.-6B (PRIOR ART)

FIGS. 3 is a cross-sectional diagram depicting the organization of the thermal transfer foil used in the method for the formation of the colored relief-and-indentation patterns of this embodiment.

In FIG. 3 thermal transfer foil (3) of this embodiment is made by stacking a base film (**3*a*), approximately 12 μm to 25 μm thick, a separable processing layer (3*b*), approximately 0.02 μm thick that is applied to the base film (3*a*); a coloring reflection layer (3*e*) which has a composite structure on whose surface a TiN (titanium nitride layer) (3*c*) approximately 0.05 μm to 0.5 μm thick, and an Al layer (3*d*) (aluminum layer) are vapor-deposited; and a bonding layer (3*f***), approximately 2 μm thick.

Because the coloring reflection layer (**3*e*) has a composite structure of a TiN layer (3*c*) and an Al layer (3*d*), it produces a golden color tone while at the same time providing the function of a reflection, coloring, and protection layer. For this reason thermal transfer foil (3) of this embodiment does not have the protective coloring layer approximately 2 μm thick which would be present in a conventional thermal transfer foil. Therefore, to ensure adequate weather resistance and mechanical strength, the coloring reflection layer (3*e*) is made relatively thick, with a thickness of approximately 0.05 μm to approximately 0.5 μm. If the coloring reflection layer (3*e*) was too thick, the relief-and-indentation patterns would not be taken up by the coloring reflection layer (3*e*) during the transfer of the relief-and-indentation patterns, thus preventing a faithful reproduction of the minute relief-and-indentation patterns. Consequently, a thickness must be chosen appropriate to the color tone to be produced, the material to be used, and the relief-and-indentation patterns to be transferred. Further, coloring reflection layer (3*e*) can be made of metals such as, in addition to TiN and Al, Zr (zirconium), Nb (niobium), Co (cobalt), Pt (platinum), Pd (palladium), In (indium), V (vanadium), Cr (chromium), Ag (silver), Au (gold), Si (silicon); their alloys or compounds either in a single layer or in multiple layers. These constituents are selected based on the color, strength, and weather resistance to be endowed on the relief-and-indentation patterns, the fabrication cost to be achieved, and other properties of the components to be made. The coloring reflection layer (3*e***) can be formed by ion-plating and sputtering as well as by vapor deposition.

The following is an explanation of the method for the formation of colored relief-and-indentation patterns using the thermal transfer foil (3) thus composed, of the present embodiment, with reference to FIGS. 4A–4D.

FIGS. 4A–4D are process cross-sectional diagrams depicting the method for the formation of the colored relief-and-indentation patterns of the present embodiment. The method for the formation of the colored relief-and-indentation patterns of the present embodiment is the same as the method for the formation of the colored relief-and-indentation patterns of Embodiment 1 in basic organization; only the organization of the thermal transfer foil used is different. Therefore, the same codes are assigned to the corresponding components, and their detailed explanation is omitted.

Figure 4A:
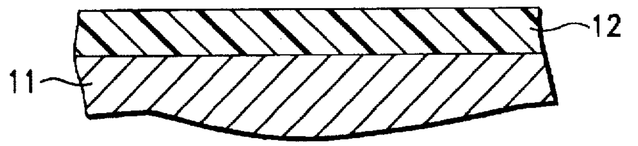
FIGS. 4A–4E are process cross-sectional diagrams that show the method of formation of the colored relief-and-indentation patterns of Embodiment 3 of the present invention.

In FIG. 4A the substrate (11) (the target material) to which the method for the formation of the colored relief-and-indentation patterns of this embodiment is applied is also a metal plate comprising a timepiece face plate (decorative component). First, a thermoplastic resin layer (12) (the surface to be decorated) is formed on the surface of substrate (11).

Figure 4B:
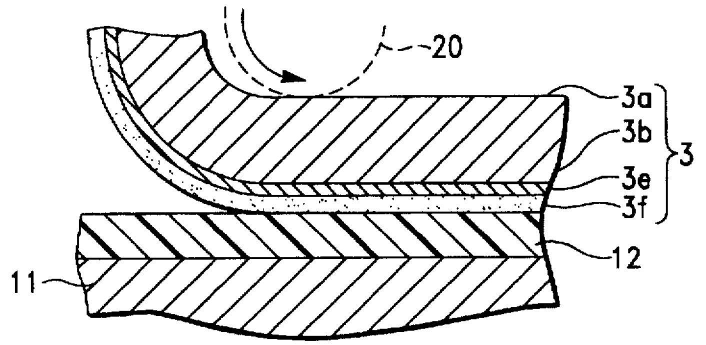

Then, as shown in FIG. 4B thermal transfer foil (3) is superimposed on the surface of the thermoplastic resin layer (12) of the substrate (11). Then, the thermal transfer foil (3) is pressed onto the surface of substrate (11) using a heated roller (20) or some other device.

Figure 4C:
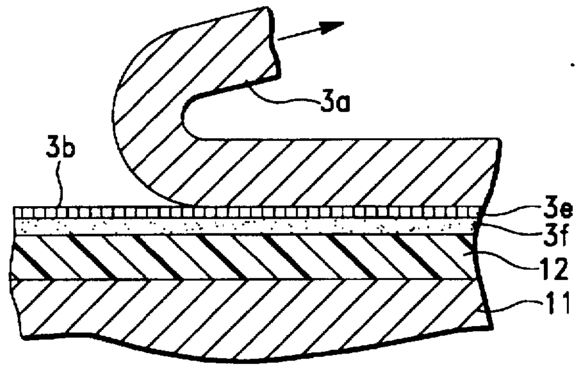

Then, as shown in FIG. 4C, base film (3*a*) of thermal transfer foil (3) is peeled off. This results in a condition in which bonding layer (3*f*), colored reflection layer (3*e*), and separable processing layer (3*b*) are transferred to substrate side (11).

Figure 4D:
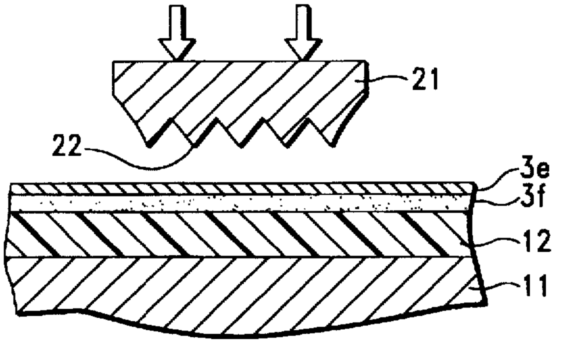
Figure 4E:
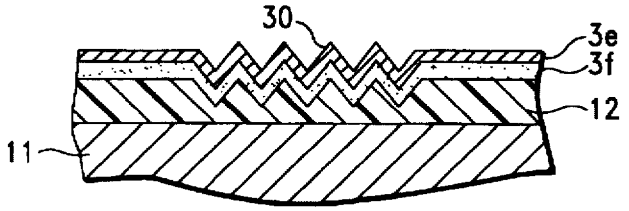

After that, as shown in FIG. 4D thermal transfer foil (3) from which base film (3*a*) has been removed by peeling is heat-pressed using mold (21). In this case pressing surface (22) of molding material (21) is provided with minute relief-and-indentation patterns 1 μm to 2 μm in size. Therefore, after mold (21) is pressed, the fine relief-and-indentation patterns are transferred to colored reflection layer (3*e*), bonding layer (3*f*), and thermoplastic resin layer (12) as fine transferred relief-and-indentation patterns (30), as shown in FIG. 4E.

As described above, in the method for the formation of the colored relief-and-indentation patterns of this embodiment, thick base film (3*a*) is peeled off before the thermal transfer foil (3) is pressed using the mold (21), thus causing a faithful transfer of the fine relief-and-indentation patterns onto mold (21).

The thermal transfer foil (3) does not contain a protective coloring layer approximately 2 μm thick as would be provided on a conventional thermal transfer foil. The gold-color coloring reflection layer (3*e*) composed of the TiN (3*d*) and Al (3*d*) layers provides all the functions of reflection, coloring, and protection layers that would be found in a conventional thermal transfer foil. Therefore, when thermal transfer foil (3) of this embodiment is used, the relief-and-indentation pattern on molding material (21) can be transferred directly to the coloring reflection layer (3*e*), thus making it possible to transfer even minute relief-and-indentation patterns. Further, because the person seeing the relief-and-indentation patterns would see directly the relief-and-indentation patterns formed on the surface of the coloring reflection layer (3*e*) without the intermediary of a protective coloring layer, there is no blurring of the patterns.

Further, the placement of weather-resistant TiN layer (3*c*) on the surface side enhances the strength of coloring reflection layer (3*e*). In addition, colors not attainable with a single material can be produced.

Variation of Embodiment 3

Whereas in Embodiment 3 coloring reflection layer (3*e*) was made using a relatively thin TiN layer (3*c*) and an Al layer (3*d*), alternatively, coloring reflection layer (3*e*) can be made using a TiN layer (3*c*) with a minimum thickness of 0.05 μm and an Al layer (3*d*) with a minimum thickness of 0.5 μm.

In this case, the fine relief-and-indentation patterns are copied by reducing the temperature of molding material (21) while increasing the pressure. When relief-and-indentation patterns are copied under these conditions, a highly functional decoration surface with superior weather resistance, corrosion resistance, and wear resistance can be formed. Such a decoration surface can be used in exterior components. Further, because the decorative surface has a gold color, decoration components having deluxe, highly metallic, fine 3D patterns, well suited for the fabrication of timepiece dials, can be produced.

The color of colored reflection layer (3*e*) can be changed by varying its constituent materials. Blue, sky blue, gray, red, green, pearl, and other colored patterns can be produced in addition to gold.

Although a protection layer was not formed on the surface of colored reflection layer (3*e*) in Embodiment 3, if a protective layer is needed for further enhancement of weather resistance, separable processing layer (3*b*) itself, for example, can be used as a protection layer. In this case, too, because the TiN layer (3*c*), which is the top layer of the colored reflection layer (3*e*), is weather resistant, it is not necessary to increase the thickness of separable processing layer (3*b*) (the protection layer). The thickness of the separable processing layer (3*b*) can be held at less than 0.2 μm, for example, in order to ensure the transfer of fine relief-and-indentation patterns. Further, a protection layer can be provided between separable processing layer (3*b*) and colored reflection layer (3*e*). In this case, too, the thickness of the protection layer is kept at less than 0.2 μm in order to ensure the transfer of fine relief-and-indentation patterns.

Embodiment 4

FIGS. 5A–5D are process cross-sectional diagrams that depict the method for the formation of the colored relief-and-indentation patterns of this embodiment.

Figure 5A:
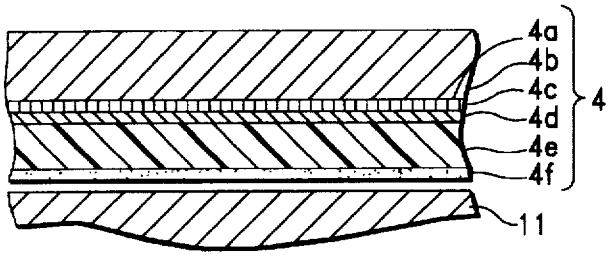
FIGS. 5A–5D are process cross-sectional diagrams that show the method of formation of the colored relief-and-indentation patterns of Embodiment 4 of the present invention.

In FIG. 5A the substrate (11) (the target material) to which the method for the formation of the relief-and-indentation patterns of this embodiment is applied could be a metal plate that comprises a timepiece face plate (decorative material), similar to Embodiment 1. To form colored relief-and-indentation patterns on this substrate (11), a thermal transfer foil (4) is used in this embodiment.

On thermal transfer foil (4), the following layers are stacked on one side of the base film (4*a*), approximately 12 μm to 25 μm thick: a separable processing layer (4*b*) approximately 0.02 μm thick; a transparent protective colored layer (4*c*) approximately 2 μm thick, and a reflection layer (4*b*) approximately 0.03 μm to 0.05 μm thick; as well as a thermoplastic resin layer (4*e*). A bonding layer (4*f*), approximately 2 μm thick, is stacked on the lower side of thermoplastic resin layer (4*e*). In this structure reflection layer (4*d*) is an aluminum thin-film layer vapor-deposited on base film (4*a*), on which protective coloring layer (4*c*) is formed. The separable processing layer (4*b*) is a processed layer, which is applied to base film (4*a*); it is there in order to enhance the ease with which base film (4*a*) can be peeled off. In this embodiment also, a resin whose deformation temperature ranges from approximately 60° C. to approximately 200° C. is selected for the fabrication of thermoplastic resin layer (4*e*). This resin can be an epoxy, acryl, polyurethane, alkyd, vinyl, olefin, ABS, polycarbonate, or vinyl chloride resin. For the bonding of reflection layer (*4d*) to thermoplastic resin layer (*4e*) thermoplastic resin layer (*4e*) itself serves as a bonding layer. However, a specific bonding layer can be formed between reflection layer (*4d*) and thermoplastic resin layer (*4e*), as necessary.

Figure 5B:
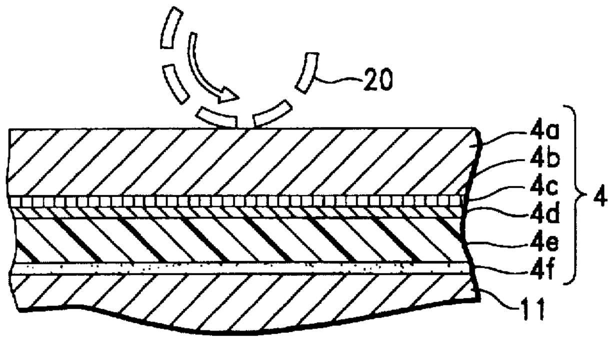

To form colored relief-and-indentation patterns on substrate (11) using a thermal transfer foil (4) of this organization, first, thermal transfer foil (4) is superimposed on the surface of the substrate (11), as shown in FIG. 5B. The surface of this substrate is pressed using a heated roller (20) or some other device in order to paste the thermal transfer foil (4) onto the substrate (11).

Although a bonding layer (*4f*) is formed in order to paste thermal transfer foil (4) onto substrate (11) in this embodiment, the use of bonding layer (*4f*) can be omitted if the thermoplastic resin layer (*4e*) can serve the purpose of a bonding agent when the thermal transfer foil (4) is pressed using a heated roller (20).

Figure 5C:
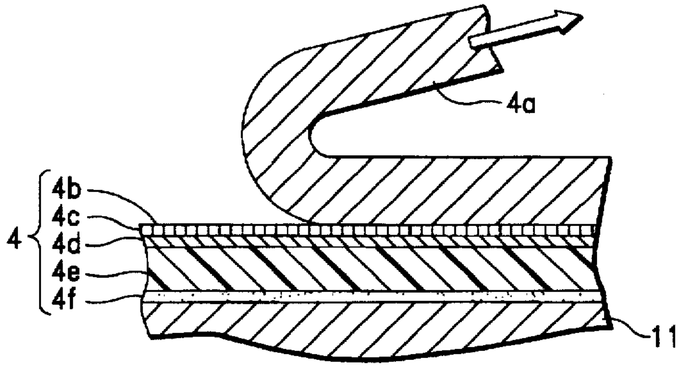

In the next step, base film (*4a*) of thermal transfer foil (4) is peeled off, as shown in FIG. 5C. This results in a condition in which the bonding layer (*4f*), thermoplastic resin layer (*4e*), reflection layer (*4d*), protective coloring layer (*4c*), and separable processing layer (*4b*) are transferred to substrate (11).

Figure 5D:
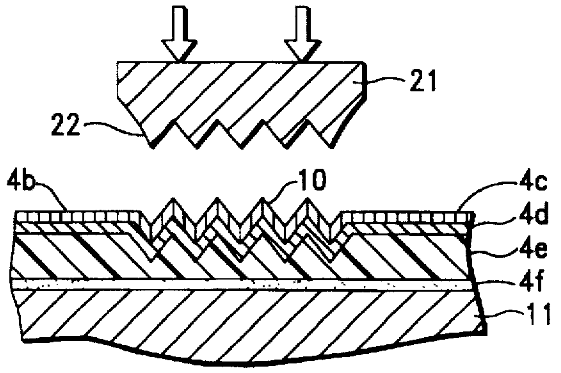
Figure 7A:
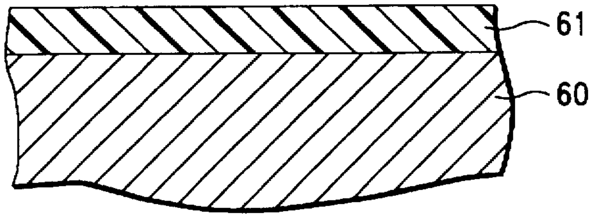
FIG.—7A (PRIOR ART)
FIGS. 7A–7C are process cross-sectional diagrams that show the conventional method for the formation of colored relief-and-indentation patterns.
Figure 7B:
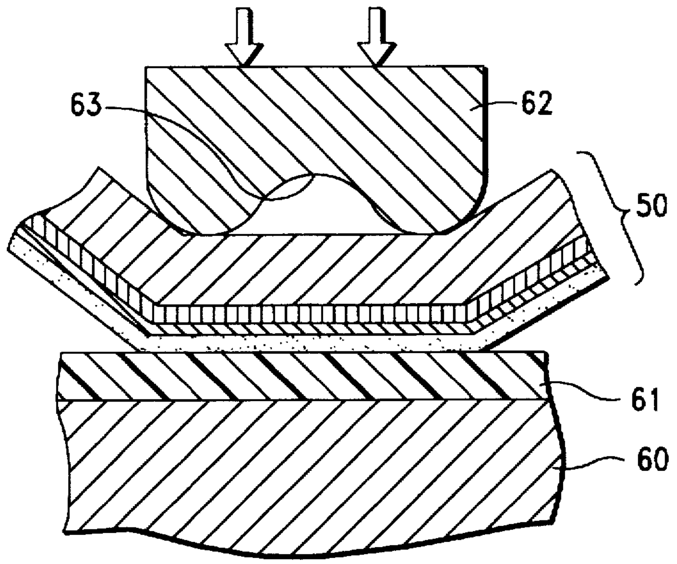
FIG.—7B (PRIOR ART)
Figure 7C:
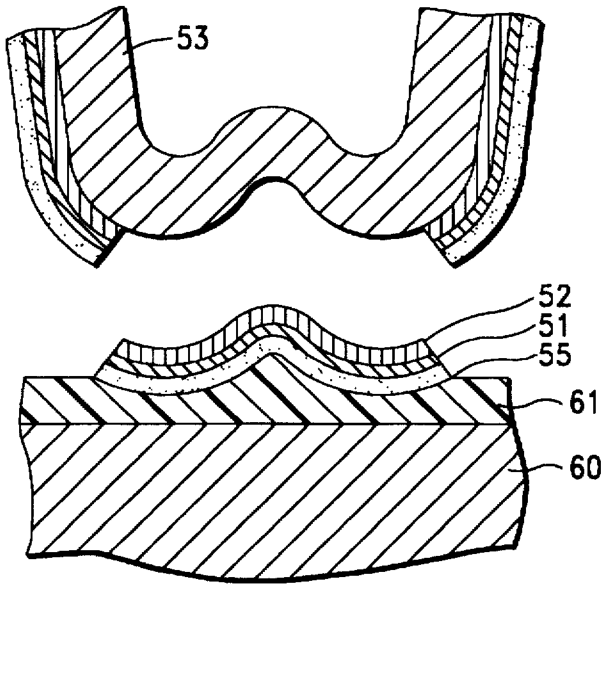
FIG.—7C (PRIOR ART)
Figure 8A:
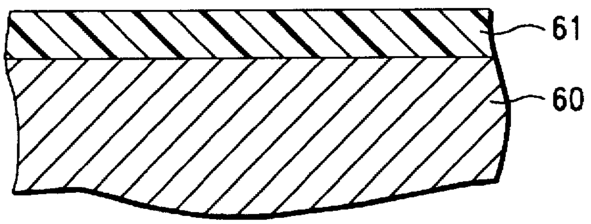
FIG.–8A (PRIOR ART)
FIGS. 8A–8C are process cross-sectional diagrams that describe the conventional method for the formation of colored relief-and-indentation patterns.
Figure 8B:
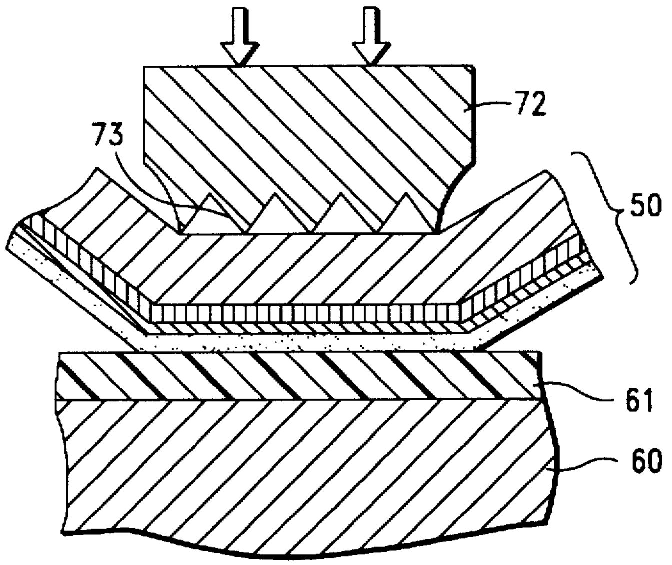
FIG.–8B (PRIOR ART)
Figure 8C:
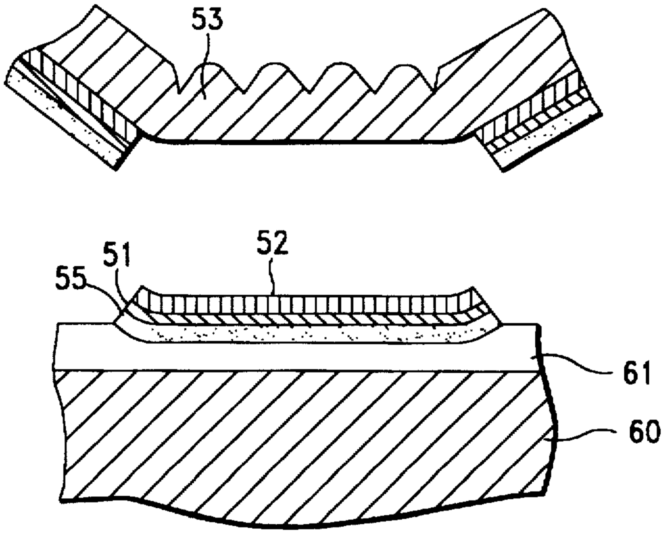
FIG.–8C (PRIOR ART)

After that, as shown in FIG. 5D, the thermal transfer foil (4), from which the base film (*1a*) has been peeled off, is heat-pressed with a mold (21) whose pressing surface (22) is provided with fine relief-and-indentation patterns a few microns in size. As a result, the fine relief-and-indentation patterns on pressing surface (22) are transferred as fine, copied relief-and-indentation patterns (10) to protective coloring layer (*4c*), reflection layer (*4d*), and thermoplastic resin layer (*4e*). For this operation the presence of separable processing layer (*4b*) on the surface of the protective coloring layer (*4c*) permits the easy separation of mold (21).

Subsequently, the final printing process is performed in order to print timepiece lettering on the surface of substrate (11) on which the fine relief-and-indentation patterns are created.

As described above, in the method for the formation of the colored relief-and-indentation patterns of this embodiment, thick base film (*4a*) is peeled off before thermal transfer foil (4) is heat-pressed by means of the mold (21), thus causing a direct heat-pressing onto the top surface of thermal transfer foil (4) that has become thin. Therefore, the fine relief-and-indentation patterns from molding material (21) are copied faithfully to reflection layer (*4d*) onto which the patterns are reflected.

Further, because thermoplastic resin layer (*4e*) is also stacked on the thermal transfer foil (4), the condition in which thermoplastic resin layer is formed on the surface of substrate (11) can be created merely by pasting the surface of the substrate (11) and thermal transfer foil (4) together, thus making it possible to omit the process of forming a thermoplastic resin layer on substrate (11). Further, in cases where, instead of a flat substrate (11), relief-and-indentation patterns are to be formed on a curved surface on which a thermoplastic resin cannot be applied easily, a thermoplastic resin layer of a uniform thickness can be formed, thus permitting a simple formation of relief-and-indentation patterns. It should be noted that, for the formation of relief-and-indentation patterns on a curved surface, a thin electrocasting mold, made by the plating of hard nickel that possesses a high degree of affinity to curved surfaces, should be used for the fabrication of mold (21).

Although this embodiment uses a thermal transfer foil (4) on which thermoplastic resin layer (*4e*), as well as separable processing layer (*4b*), protective coloring layer (*4c*), and reflection layer (*4d*), are stacked on one side of the base film (*4a*), a thermoplastic resin layer can be stacked on one side of the base film instead of the thermal transfer foil (the thermal transfer foil used in Embodiment 2 or 3) on which a separable processing layer and a coloring reflection layer are stacked. In this case also, the coloring reflection layer can be composed of a pigment layer, a metal layer, and a metal-compound layer, or of a composite layer of a metal layer and a metal-compound layer.

Other Embodiments

Although the target material is a metal plate, such as a timepiece face plate, in Embodiments 1 through 4, these embodiments are also applicable to other decorative materials, such as cosmetic containers and name plates. Further, because the target material is a metal plate that does not have a thermoplastic property, a thermoplastic resin layer is provided on its surface. However, if a part of the substrate is composed of a thermoplastic resin and if colored relief-and-indentation patterns are to be copied onto this substrate, a thermal transfer foil is directly superimposed instead of providing a thermoplastic resin layer. Similarly, when the entire target material consists of a thermoplastic resin, it is not necessary to provide a thermoplastic resin layer. In this case, processing can be carried out by means of injection molding carried on simultaneously with the transfer of the thermal transfer foil, thus reducing processing time.

Alternatively, on the surface of the substrate a heat-hardening resin layer, a single-liquid, naturally hardening resin, or a two-liquid reaction-hardening resin can be formed in a semi-hardened state, instead of using a thermoplastic resin.

In this case, a resin that permits the application of high pressure to accommodate the transfer of fine relief-and-indentation patterns, i.e., a resin that can withstand a high pressing temperature, should be selected. If the press temperature must be increased, either the transfer pressure should be lowered or the length of the copying time should be reduced. For the formation of a resin layer, an optimal method can be selected, such as painting and screen-printing, according to the resin or the substrate material or the particular shape used.

The method for the formation of colored relief-and-indentation patterns in each of the embodiments can be applied iteratively in such a way that the patterns overlap partially on the surface of the same decorative material in order to form composite patterns in which colored relief-and-indentation patterns are superimposed and decorative materials having composite colors.

Further, after copying fine relief-and-indentation patterns to a surface, a structure in which a resin layer, made of colored and transparent or semi-transparent paint or ink, can be formed by printing and other techniques. Likewise, a structure in which a glossy resin layer or a matte resin layer is formed, and a structure on whose surface a laminate film is stacked, can be adopted. In this manner, using the same thermal transfer foil material, high-quality, composite decoration can be produced by varying the colors or by combining different colors. According to this method, even if an exposed, colored reflection layer is present on the top surface, a protective layer is formed. Thus, high-quality decorative items can be produced even when the material comprising the colored reflection layer is relatively deficient in weather resistance.

Industrial Application

As described above, the method for the formation of colored patterns in this invention is characterized in that, prior to the copying of relief-and-indentation patterns from a mold to a thermal transfer foil by heat-pressing, the base film is peeled off. Therefore, according to this invention the heat-pressing is conducted on the top surface of the heat-transferred foil. This permits accurate, simple copying of fine relief-and-indentation patterns, and allows low-cost and efficient production of decoration materials containing fine relief-and-indentation patterns, patterns such as those found in natural oysters and finely woven fabric, and decoration materials possessing fine texture. Moreover, this invention does not require friction-press processing, patterning processing using abrasive and brushes, wet-plating that requires the use of toxic substances and large amounts of water, or a painting process using organic solvents, all of which would be required in the formation of fine relief-and-indentation patterns by conventional means. Thus, this invention eliminates the need for dangerous, harmful operations. The result is a substantial reduction in processing time and a simplification of processing methods, while, at the same time, substantially reducing plant and equipment capital as well as maintenance costs. Moreover, the invention does not create any environmental pollution problems and ensures a clean and safe work environment.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A thermal transfer foil comprising a base film, a separable processing layers contacting one side of the base film, a protective coloring layer, a reflection layer, and a thermoplastic resin layer, wherein said separable processing layer, said protective coloring layer, said reflection layer and said thermoplastic resin layer are stacked in the order recited on the one side of said base film.

2. A thermal transfer foil comprising a base film, a separable processing layer contacting one side of the base film, a protective coloring layer, a reflection layer, a thermoplastic resin layer and a bonding layer, wherein said separable processing layer, said protective coloring layer, said reflection layers, said thermoplastic resin layer and said bonding layer are stacked in the order recited on the one side of said base film.

3. A thermal transfer foil comprising a base film, a separable processing layer contacting one side of the base film, a coloring reflection layer, and a bonding layer, wherein said separable processing layer, said coloring reflection layer and said bonding layer are stacked in the order recited on the one side of said base film; wherein said coloring reflection layer is selected from the group consisting of a metal layer and a metal-compound layer.

4. A thermal transfer foil comprising a base film, a separable processing layer contacting one side of the base film, a coloring reflection layer, and a thermoplastic resin layer, wherein said separable processing layer, said coloring reflection layer and said thermoplastic resin layer are stacked in the order recited on the one side of said base film.

5. A thermal transfer foil comprising a base film, a separable processing layer contacting one side of the base film, a coloring reflection layer, a thermoplastic resin layer, and a bonding layer, wherein said separable processing layer, said coloring reflection layers said thermoplastic resin layer and said bonding layer are stacked in the order recited on the one side of said base film.

6. The thermal transfer foil of claim 4 or 5, wherein said coloring reflection layer comprises a pigment layer.

7. The thermal transfer foil of claim 4 or 5, wherein said coloring reflection layer is selected from the group consisting of a metal layer and a metal-compound layer.

8. The thermal transfer foil of one of claims 3 through 5 wherein said coloring reflection layer comprises a composite layer structure in which different types of layers each selected from the group consisting of metal and metal-compound layers are stacked.

9. The thermal transfer foil of one of claims 3 through 5, wherein a protective layer is provided between said separable processing layer and said coloring reflection layer, wherein a thickness of said protective layer at most approximately 0.2 μm.

10. A thermal transfer foil for the formation of colored relief-and-indentation patterns comprising a base film, a separable processing layer contacting one side of the base film, a protective coloring layer, a reflection layer, and a thermoplastic resin layer, wherein said separable processing layer, said protective coloring layer, said reflection layer and said thermoplastic resin layer are stacked in the order recited on the one side of said base film.

11. A thermal transfer foil for the formation of colored relief-and-indentation patterns for timepiece face plates comprising a base film, a separable processing layer contacting one side of the base film, a protective coloring layer, a reflection layer, and a thermoplastic resin layer, wherein said separable processing layer, said protective coloring layer, said reflection layer and said thermoplastic resin layer are stacked in the order recited on the one side of said base film.

12. A thermal transfer foil for the formation of colored relief-and-indentation patterns comprising a base film, a separable processing layer contacting one side of the base film, a protective coloring layer, a reflection layer, a thermoplastic resin layer and a bonding layer, wherein said separable processing layer, said protective coloring layer, said reflection layer, said thermoplastic resin layer and said bonding layer are stacked in the order recited on the one side of said base film.

13. A thermal transfer foil for the formation of colored relief-and-indentation patterns comprising a base film, a separable processing layer contacting one side of the base film, a coloring reflection layer, and a bonding layer, wherein said separable processing layer, said coloring reflection layer and said bonding layer are stacked in the order recited on the one side of said base film; wherein said coloring reflection layer is selected from the group consisting of a metal layer and a metal-compound layer.

14. A thermal transfer foil for the formation of colored relief-and-indentation patterns comprising a base film, a separable processing layer contacting one side of the base film, a coloring reflection layer and a thermoplastic resin layer, wherein said separable processing layer, said coloring reflection layer and said thermoplastic resin layer are stacked in the order recited on the one side of said base film.

15. A thermal transfer foil for the formation of colored relief-and-indentation patterns comprising a base film, a separable processing layer contacting one side of the base film, a coloring reflection layer, a thermoplastic resin layer, and a bonding layer, wherein said separable processing layer, said coloring reflection layer, said thermoplastic resin layer and said bonding layer are stacked in the order recited on the one side of said base film.

16. A thermal transfer foil for the formation of colored relief-and-indentation patterns for timepiece face plates comprising a base film, a separable processing layer contacting one side of the base film, a protective coloring layer, a reflection layer, a thermoplastic resin layer and a bonding layer, wherein said separable processing layer, said protective coloring layer, said reflection layer, said thermoplastic resin layer and said bonding layer are stacked in the order recited on the one side of said base film.

17. A thermal transfer foil for the formation of colored relief-and-indentation patterns for timepiece face plates comprising a base film, a separable processing layer contacting one side of the base film, a coloring reflection layer, and a bonding layer, wherein said separable processing layer, said coloring reflection layer and said bonding layer are stacked in the order recited on the one side of said base film; wherein said coloring reflection layer is selected from the group consisting of a metal layer and a metal-compound layer.

18. A thermal transfer foil for the formation of colored relief-and-indentation patterns for timepiece face plates comprising a base film, a separable processing layer contacting one side of the base film, a coloring reflection layer and a thermoplastic resin layer, wherein said separable processing layer, said coloring reflection layer and said thermoplastic resin layer are stacked in the order recited on the one side of said base film.

19. A thermal transfer foil for the formation of colored relief-and-indentation patterns for timepiece face plates comprising a base film, a separable processing layer contacting one side of the base film, a coloring reflection layer, a thermoplastic resin layer, and a bonding layer, wherein said separable processing layer, said coloring reflection layer, said thermoplastic resin layer and said bonding layer are stacked in the order recited on the one side of said base film.

20. A method of formation of colored relief-and-indentation patterns comprising:

providing a target material having a deformable surface to be decorated;

providing a thermal transfer foil composed of a base film and a plurality of layers, the plurality of layers including a separable processing layer, at least one coloring layer and a bonding layer arranged in a stack, with the base film and bonding layers providing outer surfaces of the thermal transfer foil;

superimposing the thermal transfer foil on the surface of the target material so that the bonding layer is in contact with the surface to be decorated;

after said step of superimposing, peeling the base film away from the plurality of layers; and after said step of peeling, pressing a mold providing relief and indentation patterns into the plurality of layers to transfer the patterns to the surface to be decorated.

21. The method of claim 20 wherein the at least one coloring layer comprises a protective coloring layer and a reflection layer, said protective coloring layer being interposed between said reflection layer and said separable processing layer.

22. The method of claim 20 wherein the at least one coloring layer comprises a colored reflection layer.

23. The method of claim 22 wherein the colored reflection layer is selected from the group consisting of a metal layer and a metal-compound layer.

24. The method of claim 22 wherein the plurality of layers further includes a protection layer interposed between the separable processing layer and the colored reflection layer and having a thickness not greater than 0.2 μm.

25. The method of claim 22 wherein the colored reflection layer comprises a pigment layer.

26. The method of any one of claims 20 to 24 wherein the surface to be decorated is made of a thermoplastic material and said step of pressing is a heat pressing operation.

27. The method of claim 26 wherein said step of providing a target material comprises superimposing a layer of the thermoplastic material onto a substrate.

28. The method of claim 27 wherein the substrate is a timepiece face plate.

29. A method of formation of colored relief-and-indentation patterns comprising:

providing a substrate;

providing a thermal transfer foil composed of a base film and a plurality of layers, the plurality of layers including a separable processing layer, at least one coloring layer and a deformable layer arranged in a stack, with the base film providing an outer surface of the thermal transfer foil, the separable processing layer being interposed between the base film and the deformable layer and the coloring layer being interposed between the separable processing layer and the deformable layer;

superimposing the thermal transfer foil on the substrate so that the deformable layer is supported by the substrate;

after said step of superimposing, peeling the base film away from the plurality of layers; and after said step of peeling, pressing a mold providing relief and indentation patterns into the plurality of layers to transfer the patterns to the deformable layer.

30. The method of claim 29 wherein the at least one coloring layer comprises a protective coloring layer and a reflection layer, said protective coloring layer being interposed between said reflection layer and said separable processing layer.

31. The method of claim 29 wherein the at least one coloring layer comprises a colored reflection layer.

32. The method of claim 31 wherein the colored reflection layer comprises a pigment layer.

33. The method of claim 31 wherein the colored reflection layer is selected from the group consisting of a metal layer and a metal-compound layer.

34. The method of any one of claims 29 to 33 wherein the deformable layer is made of a thermoplastic material and said step of pressing is a heat pressing operation.

35. The method of any one claims 29 to 32 wherein the plurality of layers further includes a bonding layer covering the deformable layer so as to bond the deformable layer to the substrate.

36. The method of claim 29 wherein the deformable layer is made of a thermoplastic material and said step of pressing is a heat pressing operation.

37. The method of claim 29 wherein the substrate is a timepiece face plate.

* * * * *

UNITED STATES PATENT AND TRADEMARK OFFICE

CERTIFICATE OF CORRECTION

PATENT NO. : 5,750,241
DATED : May 12, 1998
INVENTOR(S) : Koichi Kobayashi, et al.

It is certified that errors appear in the above identified patent and that said Letters Patent is hereby corrected as shown below:

Title page, item number 56, Other Publications, insert --European Search Report dated July 5, 1995, Appl. No. EP 94 90 7688--.

Column 13, line 37, change "layers" to --layer--.

Column 14, line 2, change "layers" to --layer--.

line 2, insert --,-- after "reflection layers".

line 18, insert --is-- after "protective layer".

Column 16, line 10, change "claims 20 to 24" to --claims 20 to 25--.

line 54, insert --of-- after "any one".

Signed and Sealed this

Twentieth Day of October, 1998

*Attest:*

BRUCE LEHMAN

*Attesting Officer* *Commissioner of Patents and Trademarks*